H. H. NELSON.
BRACKET FOR CURTAIN POLES.
APPLICATION FILED MAY 14, 1920.
1,374,026.
Patented Apr. 5, 1921.
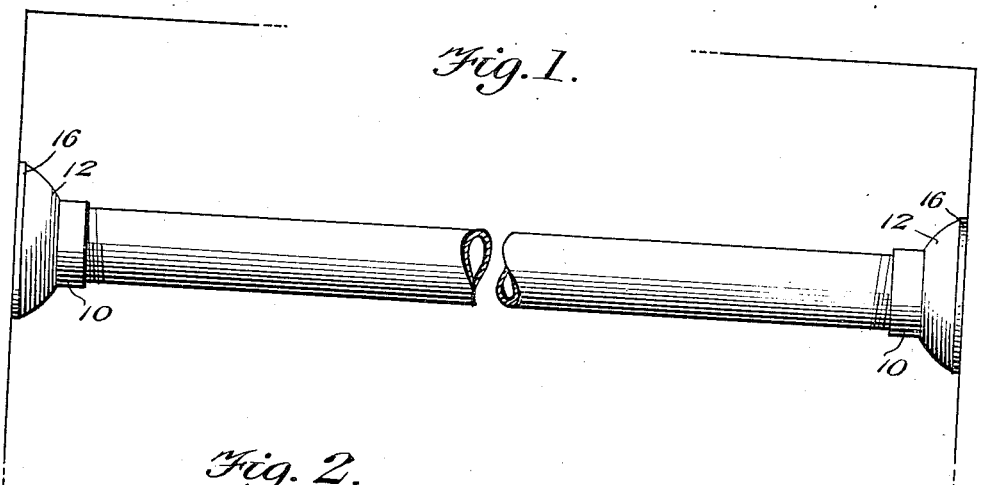
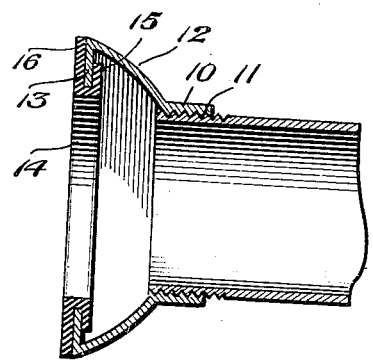
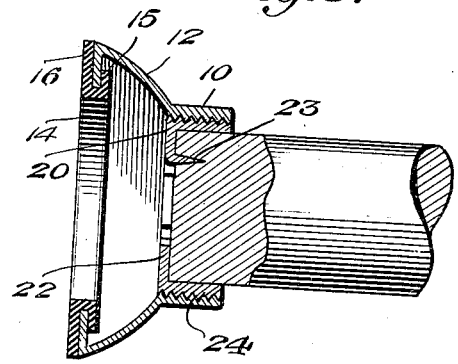
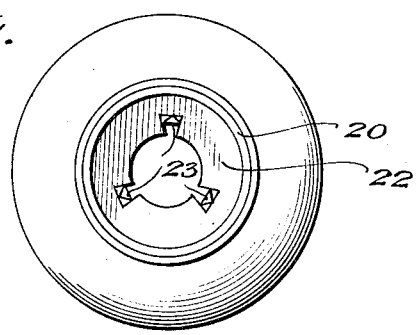
Harry H. Nelson
INVENTOR

UNITED STATES PATENT OFFICE.

HARRY H. NELSON, OF MINNEAPOLIS, MINNESOTA, ASSIGNOR OF ONE-HALF TO PETER A. NELSON, OF MINNEAPOLIS, MINNESOTA.

BRACKET FOR CURTAIN-POLES.

1,374,026.

Specification of Letters Patent.   Patented Apr. 5, 1921.

Application filed May 14, 1920. Serial No. 381,422.

*To all whom it may concern:*

Be it known that I, HARRY H. NELSON, a citizen of the United States, residing at Minneapolis, in the county of Hennepin and State of Minnesota, have invented new and useful Improvements in Brackets for Curtain-Poles, of which the following is a specification.

This invention relates to a bracket for curtain poles, and the like, the device being also adapted for use in various other connections.

One object is to provide a bracket for supporting a rod or pole for use in connection with window display curtains, door curtains, draperies, and similar articles, and especially adapted for use under conditions rendering the use of separate securing devices undesirable.

A still further object is to provide brackets designed to be manufactured and sold in pairs, and having threaded connection with the ends of the pole or rod, the brackets being forced into positive contact with the window or door frame, by imparting rotary movement to the rod.

A still further object is to provide a bracket which may be employed with wooden or with metal rods or poles, as circumstances or convenience may require.

With the foregoing and other objects in view, the invention consists in the novel construction, combination, and arrangement of elements hereinafter described and claimed.

In the drawings:

Figure 1 shows two of the brackets in elevation, with a pole mounted therein, the central portion of the pole being broken away.

Fig. 2 is a view of one of the brackets, in section.

Fig. 3 is a similar view of another form.

Fig. 4 is an end view, looking from the left in Fig. 3.

In carrying out my invention, I provide a bracket having a cylindrical portion 10, threaded internally as shown at 11, said bracket having also a flared portion 12 provided with an internally extending flange 13. A rubber washer or pad 14 includes two flanged portions, 15 and 16, between which the flange 13 projects, in order to positively retain the element 14 in position. This pad contacts with the surface of the door or window frame, any degree of pressure demanded by the weight of the curtains being possible, in view of the connections with the rod or pole.

The pole 18 is threaded at its ends, the threads being reversely arranged, and the threads 11 of each pair of brackets also being reversely arranged, for coöperation with the pole. If the pole or rod is of metal, this element is threaded directly into the threads 11 of the brackets. If of wood, bushings 20 are employed, each of the latter being provided with end portions 22 having central openings therein. In stamping out these openings, prongs 23 are provided for engagement with the ends of the pole.

The bushings are threaded externally as indicated at 24, and the threads coöperate with the reversely arranged threads 11 of the brackets.

In the use of the device, no tools or separate securing devices are required, the curtain may be hung, shifted, or removed almost instantly, and the window or door frame will not be marred. Preliminary adjustment may be secured, after which the rod or pole may be screwed up more tightly for securing the required pressure. The device is durable and inexpensive considering the advantages derived from its use.

What is claimed is—

The combination with a curtain pole having a threaded end, of a bracket having an internally threaded opening, a flared portion and an inwardly extending flange, and a flexible element contacting with the outer surface of the flange, said flexible element including a plurality of spaced circumferential flanges having interlocking engagement with the inwardly turned flange of the bracket.

In testimony whereof I affix my signature.

HARRY H. NELSON.